United States Patent
Kaidi (10) Patent No.: US 12,316,650 B2
(45) Date of Patent: May 27, 2025

(54) COMPUTING SYSTEM DEFENSES TO ROTATING IP ADDRESSES DURING COMPUTING ATTACKS

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 561 days.

(21) Appl. No.: 17/481,189

(22) Filed: Sep. 21, 2021

(65) Prior Publication Data

US 2023/0086281 A1    Mar. 23, 2023

(51) Int. Cl.
*H04L 9/00* (2022.01)
*H04L 9/40* (2022.01)

(52) U.S. Cl.
CPC ...... *H04L 63/1416* (2013.01); *H04L 63/0236* (2013.01); *H04L 63/1425* (2013.01); *H04L 63/1466* (2013.01); *H04L 63/20* (2013.01)

(58) Field of Classification Search
CPC ............. H04L 63/1416; H04L 63/0236; H04L 63/1425; H04L 63/1466; H04L 63/20
See application file for complete search history.

(56) References Cited

U.S. PATENT DOCUMENTS

| | | | | |
|---|---|---|---|---|
| 9,148,424 | B1 * | 9/2015 | Yang | H04L 63/083 |
| 9,838,384 | B1 * | 12/2017 | Kane-Parry | G06F 21/316 |
| 2016/0127380 | A1 * | 5/2016 | Steele | H04L 63/14 726/7 |
| 2019/0074961 | A1 * | 3/2019 | Tanizawa | H04L 9/32 |
| 2019/0098050 | A1 * | 3/2019 | Lumezanu | H04L 43/026 |
| 2019/0387005 | A1 * | 12/2019 | Zawoad | H04L 61/4511 |
| 2020/0213346 | A1 * | 7/2020 | Shafet | G06F 16/953 |
| 2021/0288981 | A1 * | 9/2021 | Numainville | H04L 63/1416 |
| 2021/0306303 | A1 * | 9/2021 | Lewin | H04L 63/168 |

FOREIGN PATENT DOCUMENTS

| | | | | |
|---|---|---|---|---|
| CN | 110933055 | A | * 3/2020 | H04L 63/08 |
| CN | 110933055 | B | * 12/2021 | H04L 63/08 |

* cited by examiner

*Primary Examiner* — Syed M Ahsan (74) *Attorney, Agent, or Firm* — Haynes and Boone, LLP (57) ABSTRACT

Computing system defenses to rotating IP addresses by malicious entities during computing attacks are disclosed. An online entity may utilize a framework having computing operations for detecting and protecting from computing attacks using IP address rotation through multiple IP addresses to hide the malicious conduct. The threat detection system and framework may perform processes that indicate whether IP addresses are correlated and being used in the same computing operations, which may be malicious or fraudulent. If correlated, the framework may further determine that the IP addresses are being used to perpetrate the same or similar computing attack from a malicious actor. The framework may the execute one or more processes to protect from the computing attack that uses the rotation of IP addresses, including IP address blocking, manual challenges, and changing status code identifiers for webpage access requests.

20 Claims, 6 Drawing Sheets

IP Address — 326
First Time + Machine Fingerprint — 328
Country of Origin — 330
Account Holder Country — 332
Account Access Time + Address
Usage time — 334

FIG. 3E

Time on Site — 30 ms — 336
Average Time on Site — 45 seconds — 338

COMPUTING SYSTEM DEFENSES TO ROTATING IP ADDRESSES DURING COMPUTING ATTACKS

TECHNICAL FIELD

The present application generally relates to security and risk detection systems in computing environments, and more particularly to determining when malicious entities rotate through Internet protocol (IP) addresses during computing attacks, according to various embodiments.

BACKGROUND

Online service providers may provide services to different users, such as individual end users, merchants, companies, and other entities. When providing these services, the service providers may provide an online platform that may be accessible over a network. Users may utilize a computing device to access and utilize different processes, operations, applications, and platforms of the service provider available over the network, as well as request processing of data.

As hackers and other malicious entities become more sophisticated, they may perform different computing attacks and other malicious conduct against a service provider. For example, fraudsters may attempt to compromise sensitive data, or attempt to perform fraudulent electronic transaction processing or account takeover. Service providers may thus utilize security and risk detection systems to identify suspicious behavior and malicious activities.

However, as computing attacks by malicious entities become increasingly sophisticated, the malicious entities may obtain and use multiple different IP addresses and may rotate through use of the IP addresses to mask their identity and nature of the computing attacks. These techniques attempt to compromise a service provider's computing systems. Applicant recognizes there is a need for improved and faster detection of IP address rotations by malicious entities during computing attacks to defend against such attacks.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for computing system defenses to rotating IP addresses by malicious entities during computing attacks. Systems suitable for practicing methods of the present disclosure are also provided. Note that while various examples, structures, techniques, etc. may be described with respect to a service provider in this specification, these structures, techniques, etc. are generalizeable and are applicable to any entity that implements security systems and defenses for rotating IP addresses by malicious entities during computing attacks according to various embodiments.

In an entity's (e.g., service provider's) systems, such as online platforms and systems that allow users to interact with, use, and request data processing, the service provider may provide a computing architecture that may face different types of computing attacks coming from malicious sources over a network. For example, a malicious actor may initiate a computing attack on the computing environment of the service provider, such as credential stuffing, signup and/or account validation, carding attacks (e.g., credit/debit card stuffing and/or card verification for multiple and/or parallel attempts to authorize and/or validate card credentials), a hypertext transfer protocol (HTTP) smuggling request, denial-of-service (DoS) and distributed denial-of-service (DDoS) attacks, a fraudulent transaction processing request, a password attack, a web abuse (e.g., account enumeration, brute-force attacks and logins, structured query language (SQL) injection), or other type of computing attack.

When performing these computing attacks, malicious entities may obtain a pool of IP addresses, such as several related but different and/or unrelated IP addresses that may be used by the malicious entity's computing device(s) and/or server(s) to operate on a network, send and receive communications and application programming interface (API) calls or requests, and perform the computing attacks over a network. The malicious entity may then rotate through these IP addresses during the computing attacks so it is less likely the service provider, a security entity, or the like may identify the computing attacks and/or malicious entity and take actions to prevent the computing attacks and/or identify the malicious entity. Thus, these computing attacks using rotating IP addresses may introduce risk to resources of the service provider, secure and sensitive data, and/or fraud and loss by the service provider.

In order to identify, remedy, stop, and/or prevent IP address rotation during computing attacks and other abuses of the service providers, the service providers may utilize a rotating IP address protection framework having multiple computing operations to determine correlations between IP addresses and/or computing logs for network communications and/or API calls and requests. These correlations may be used to determine that the IP addresses are being used by the same or similar malicious device, server, and/or entity during a computing attack targeting the service provider's computing systems, architecture, and/or services. Computing logs may correspond to network traffic logs, firewall logs, Windows Event Logs (commonly referred to as a "WinEventLog" or the like), and the like. Computing logs may therefore correspond to log files that record events and corresponding activities of IP addresses when interacting with the computing platform, system, and/or services of the online service provider.

Computing logs may include activities associated with events on a computing system corresponding to an IP address, such as those associated with an operating system (OS) and/or software as those execute on a computing device. The computing logs may also record network traffic activities and data from an IP address, database transactions associated with changes to databases and corresponding data, messages, and/or server activities coming through as web traffic via a particular domain or platform of the service provider. A computing log may include different data fields having attribute data in each field, such as a firewall log from web traffic for an IP address. An exemplary network traffic log may include data such as a user agent string, source (e.g., a source IP address that may be rotated through a pool of IP addresses during a computing attack), source port, method, account number, status, uniform resource identifier (uri) path, destination, destination port, bytes out, bytes in, etc. The computing logs may be monitored over a time period or time frame, such as logs for IP addresses that are detected and/or received over an X hour (or second(s), minute(s), day(s), week(s), etc.) time period and/or of a selected length in the past (e.g., X second(s), minute(s), hour(s), day(s), week(s), etc. ago).

When monitoring the network traffic or other computing logs for incoming communications, API calls/requests, and the like, the service provider's computing architecture may include a security and/or threat detection and mitigation service that utilizes a rotating IP address protection framework to detect when IP addresses are rotated by a malicious entity (e.g., using one or more computing devices and/or servers). The rotating IP address protection framework may determine correlations or commonalities between logs, computing service uses, data processing requests, and/or IP addresses to determine when IP address rotation is being performed. For example, malicious entities may obtain a pool or set of IP addresses using botnets (e.g., pools or sets of computing devices that may be infected or controlled by bots), proxies, virtual private networks (VPNs), tunneling services, and/or cloud APIs. These IP addresses may then be rotated during computing attacks to avoid detection and attack prevention or damage mitigation. The rotating IP address protection framework may seek to determine whether requests from IP addresses in a pool used by a malicious entity is coming in succession or in a close time period, whether the IP addresses have commonalities (e.g., from the same IP address provider or are connected by an autonomous system number (ASN) for an autonomous system (AS)), share a same or similar target endpoint for a request from the IP addresses, have the same or similar payload or payload patterns, and the like. The rotating IP address protection framework may utilize multiple different tools and/or computing operations to determine if the IP address have correlations or share common signatures, data, and/or requests.

For example, the rotating IP address protection framework may first check an ASN ratio for the IP address group and/or AS corresponding to the IP addresses. The ASN ratio may correspond to a ratio of abuse against or versus unique successes by the IP addresses when performing a computing action or using a computing service. If the ASN has a poor ratio and/or reputation for the IP address, the requests by the IP address may be refused, a manual challenge may be issued, and/or the IP address may be blocked. Thus, only IP addresses and/or pools with high ratios of prior successes may be allowed and for IP addresses without prior success, if the derived ASN reputation and/or ratio is poor and the IP address is hitting the same endpoint, the IP address may be blocked, or manual challenges may be issued. Similarly, an originating point of access and/or location for the IP address may be checked for suspicious and/or fraudulent activity. In this regard, certain countries or other locations may be designated as more suspicious than others, and therefore treated with higher security and/or blocked.

The location or country of origin and/or time of access/request by the IP address may also be compared to account data for an account the IP address is attempting to access, such as an address or location set for the account and a usual time of access and/or use of an account. If the location of origin and time of access do not match the account data, the IP address may be identified as suspicious, a manual challenge may be issued, and/or the IP address may be blocked. However, if matching, the IP address may not be suspicious or identified as being used during an IP address rotation. A machine fingerprint for a suspicious or malicious device may also be identified for new IP addresses, and a manual challenge or block may issue to those new IP addresses.

The rotating IP address protection framework may also examine machine, payload, and/or endpoint data for the network traffic or other computing logs and/or API requests by IP addresses to identify IP address rotation and/or computing attacks. For example, the framework may utilize an IP address and/or log fingerprint that uses a combination of a payload or payload pattern for the data processing request from the IP address, a target endpoint (e.g., computing service such as a login webpage or interface, a payment card validation endpoint, etc.), and/or a machine or device fingerprint for the machine corresponding to the IP address and request. This combination may be used to generate a fingerprint or signature and requests associated the same or similar signature may be blocked or manual challenges issued. Similarly, the machine for the IP address(es) and the machine's interactions with the service provider's platform, website, and/or application interfaces may be monitored. If the machine's interactions appear suspicious, the corresponding IP address may be blocked, or the machine may be challenged. For example, the machine's interactions may be analyzed to determine a time-on-site or time-on-interface. Automated requests using new or rotated IP addresses may have a same or similar time, which may be extremely short (e.g., in milliseconds (ms)) and/or consistent. Thus, automated requests may increase a likelihood of abusive web traffic and requests from rotated IP addresses.

The rotating IP address protection framework may also analyze elements of the payload for the web traffic and/or logs from the IP address(es). For example, when a password is sent to a backend server for processing, it may be hashed on the transmitting machine (e.g., when entered to a webpage or interface field) or may be hashed when received by the server. In order to detect whether passwords are being stuffed or enumerated through during a computing attack and/or account takeover (e.g., when enumerating through a set such as password1, password2, password3, password, passw0rd, or other similar but changed passwords), portions of the entered password may be broken up and separately hashed instead of the entire password. When hashing, a small change in text may cause different hashes, thus, by hashing different portions (e.g., hashing "pass" and "word1", word2", etc.), portions of the password may be hashed and compared to identify password and/or credential enumeration. Similarly, account name, identifier, email address, and the like in the payload may be compared. During account enumeration, account names may similarly be enumerated in a similar fashion (e.g., Alice1, Alice2, Alice3, etc.), which may be used to identify the same or similar computing attack from different IP addresses that are being rotated. Further, the enumerated account name may be known to be in a compromised list, and therefore, if used, other account names known in that list may be used to identify IP addresses corresponding to the same or similar computing attack using IP address rotation.

If a set, group, or pool of IP addresses are identified as being rotated through during a computing attack, additional defenses and/or protections may be implemented to mitigate and/or prevent damage, abuse, and fraud. The mitigation operations may include transmitting a manual challenge and/or multifactor authentication challenge. The manual challenge may correspond to a challenge that requires a human user to respond. This may include various CAPTCHA challenges, challenges to enter data specific to an account or other data that access to is requested, perform an activity or respond to a question requiring human knowledge and/or skills, or the like. A multifactor authentication challenge may use another device and/or account to send a secret or code that requires entry and/or respond to a manual challenge.

Further, changes to rate limiting policies based on payload and/or changes to returned status codes may be used to limit and/or mitigate computing attacks and damage. A rate limit policy may be to limit API requests and/or data processing operations from a device or IP address to a certain amount or number over a time period. For example, a rate limit policy may establish that if more than ten requests are received over a 300 ms time period, a blocked status code may be returned, and the IP address may be blocked. These rate limit policies may also be dynamic so that different numbers and/or time periods may be used. However, this may require that a blocked status code (e.g., a 429 status code) is returned, which may alert the malicious entity using the IP address that the IP address is now blocked. Instead of returning a series of "too many request" 429 status codes, a varying number of failed status codes (e.g., 401 status code) or success status codes (e.g., 200 success) may be returned so that the IP address is not rotated, and certain attacks are mitigated when the blocked IP address is used.

Further, if the payload indicates a carding attack, different responses and/or status codes that indicate IP address were not blocked when the card credentials were entered may be used to limit the number of card credential enumeration attempted. For example, when enumerating through a list of compromised cards by a malicious entity, the entered card credential may vary by more than one or two numbers (e.g., which may instead indicate an error in typing by a user). Thus, when detected, the service provider may instead indicate that the attempt failed instead of being blocked so that the malicious party continues to enter compromised card credentials even when the IP address is blocked.

In this regard, the service provider may deploy the rotating IP address protection framework for a security and threat detection system, such as a security information and event management team. For example, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user. Other service providers may also provide computing services, including social networking, microblogging, media sharing, messaging, business and consumer platforms, etc. In order to utilize the computing services of a service provider, the service provider may provide a computing architecture and environment where the users may access and utilize operations provided by the service provider.

However, malicious end users and/or computing devices (e.g., computing devices that may include malware, viruses, and the like that may be hijacked to automate computing attacks) may attempt to abuse the service provider's systems through computing attacks that use IP address rotation to obscure or hide the computing attacks and malicious devices, endpoints, and/or entities. Thus, the aforementioned processes may be utilized to provide automated detection of IP address rotation and protection from computing attacks during IP address rotation. These may be deployed with less computing resources and computational intensity, thereby reducing server and data processing loads and providing faster and automated detection of and protection from IP address rotation. Further, the rotating IP address protection framework may provide better and more accurate threat detection from IP address rotation in computing systems.

Figure 1:
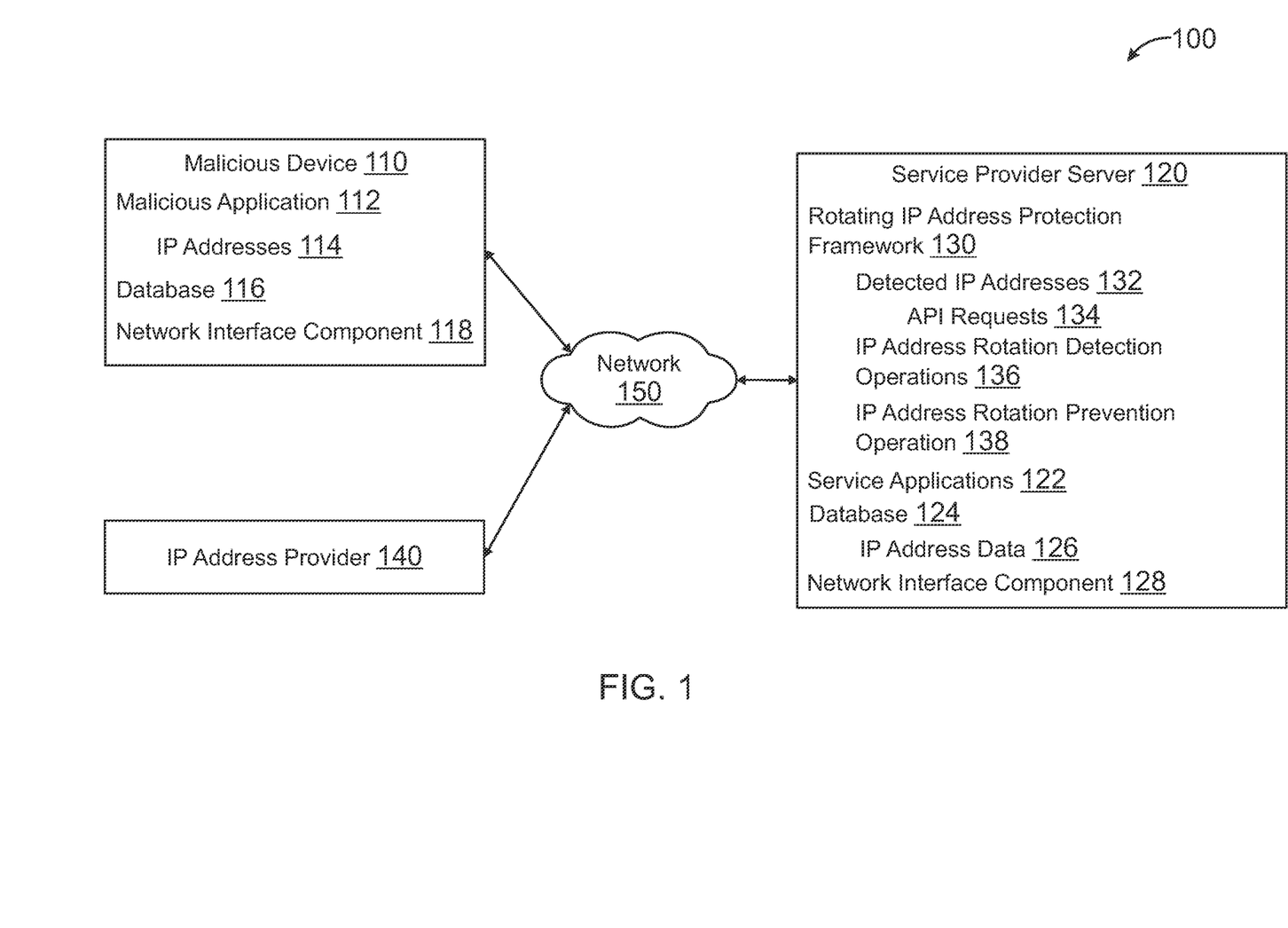
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a malicious device 110, a service provider server 120, and an IP address provider 140 in communication over a network 150. Malicious device 110 may be utilized by a malicious user or other bad actor to perform some computing attack over network 150, where service provider server 120 may provide various data, operations, and other functions over network 150. However, in other embodiments, malicious device 110 may also be compromised, and therefore include security issues that may affect service provider server 120. In this regard, malicious device 110 may direct the computing device against the systems of service provider server 120, which may utilize a pool of IP addresses provided by IP address provider 140. In order to detect IP address rotation using these IP addresses during a computing attack, service provider server 120 may use the operations and components discussed herein.

Malicious device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Malicious device 110 may be implemented as a communication device that may utilize appropriate hardware and software configured for wired and/or wireless communication with service provider server 120. For example, in one embodiment, malicious device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Malicious device 110 of FIG. 1 contains a malicious application 112, a database 116, and a network interface component 118. Malicious application 112 may correspond to executable processes, procedures, and/or applications with associated hardware. In other embodiments, malicious device 110 may include additional or different modules having specialized hardware and/or software as required.

Malicious application 112 may correspond to one or more processes to execute software modules and associated components of malicious device 110 to provide features, services, and other operations for a user over network 150, which may include accessing and/or interacting with service provider server 120. In this regard, malicious application 112 may correspond to specialized software utilized by a user of malicious device 110 that may be used to access a website or UI provided by service provider server 120 to perform actions or operations. In various embodiments, malicious application 112 may correspond to a general browser application configured to retrieve, present, and communicate information over the Internet (e.g., utilize resources on the World Wide Web) or a private network. For example, malicious application 112 may provide a web browser, which may send and receive information over network 150, including retrieving website information (e.g., a website for a merchant), presenting the website information to the user, and/or communicating information to the website.

However, in other embodiments, malicious application 112 may include a dedicated application of service provider server 120 or other entity (e.g., a merchant). Malicious application 112 may be associated with account information, user financial information, and/or transaction histories. However, in further embodiments, different services may be provided via malicious application 112, including messaging, social networking, media posting or sharing, microblogging, data browsing and searching, online shopping, and other services available through service provider server 120. Thus, malicious application 112 may also correspond to different service applications and the like that are associated with service provider server 120.

When using malicious application 112, a bad actor may execute a computing attack and/or automated script to perform some operation to compromise service provider server 120 and/or conduct fraud. These executable scripts may be executed with malicious application 112, which may automate some function. In some embodiments, executable scripts may be used for account enumeration, multiple login attempts, scripted form filling, and the like. When performing these computing attacks, a pool of IP addresses may be used, which may attempt to mask or hide the fraudulent and/or abusive conduct with service provider server 120. Malicious application 112 may use the pool of IP addresses provided by IP address provider 140 to perform the computing attack. Thus, where malicious application 112 is being used to attempt to discover secret or sensitive information, takeover an account, request fraudulent electronic transaction processing, or otherwise perform an illegal action or malicious conduct that is barred by the rules and regulations of service provider server 120 using the pool of IP addresses, service provider server 120 may utilize a rotating IP address protection framework 130 to identify IP address rotation and protect from such computing attacks using the pool of IP addresses. In some embodiments, other types computing attacks may correspond to a HTTP smuggling request, denial-of-service (DoS) and distributed denial-of-service (DDoS) attacks, a fraudulent transaction processing request, a password or eavesdropping attack, a session hijacking or Man-in-the-Middle (MitM) attack, or other type of computing attack. During these activities with service provider server 120, a corresponding computing log may be generated and used by service provider server 120 for identification of IP address rotation.

Malicious device 110 may further include database 116 stored on a transitory and/or non-transitory memory of malicious device 110, which may store various applications and data and be utilized during execution of various modules of malicious device 110. Database 116 may include, for example, identifiers such as operating system registry entries, cookies associated with malicious application 112 and/or other applications, identifiers associated with hardware of malicious device 110, or other appropriate identifiers, such as identifiers used for payment/user/device authentication or identification, which may be communicated as identifying the user/malicious device 110 to service provider server 120. Moreover, database 116 may store operations and data associated with request and/or network traffic log data, such as computer event logs and/or network traffic data that may be provided to service provider server 120.

Malicious device 110 includes at least one network interface component 118 adapted to communicate with service provider server 120 and/or IP address provider 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide detection and protection systems for computing systems and infrastructure of service provider server 120 when computing attacks are executed using rotating IP addresses. In this regard, service provider server 120 includes one or more processing applications which may be configured to interact with malicious device 110 to determine whether malicious device 110 is rotating through IP addresses during a computing attack. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a rotating IP address protection framework 130, service applications 122, a database 124, and a network interface component 128. Service applications 122 and rotating IP address protection framework 130 may correspond to executable processes, procedures, and/or applications with associated hardware. In other embodiments, service provider server 120 may include additional or different modules having specialized hardware and/or software as required.

Rotating IP address protection framework 130 may correspond to one or more processes to execute modules and associated specialized hardware of service provider server 120 to provide a framework to detect and protect against computing attacks by detecting IP address rotations during these computing attacks. In this regard, rotating IP address protection framework 130 may correspond to specialized hardware and/or software used by service provider server 120 to monitor detected IP addresses 132 and determine whether the IP addresses are being rotated using IP address rotation detection operations 136. Further, rotating IP address protection framework 130 may protect from computing attacks performed by detected IP addresses 132 during an IP address rotation using IP address rotation prevention operations 138.

In this regard, rotating IP address protection framework 130 may include different operations for detection and protection from computing attacks using IP address rotation. For example, rotating IP address protection framework 130 may first monitor detected IP addresses 132 associated with API requests 134, which may include monitoring and/or processing computing and/or network traffic logs for API requests 134 and other data processing requests by detected IP addresses 132. At least a portion of detected IP addresses 132 may be used by malicious device 110, such as IP addresses 114 used by malicious device 110 to perform a computing attack that adversely affects service provider server 120. This may include abuse and/or fraud attempted with service applications 122. API requests 134 may have corresponding computing logs that may include data that may be processed, including identifying correlations and/or commonalities between target endpoints, payloads, IP addresses, time period of use, and/or machine fingerprints.

IP address rotation detection operations 136 of rotating IP address protection framework 130 may implement one or more detection operations to identify IP address rotation. The detection operations may include performing a real-time calculation of an ASN ratio of abuse against unique successes for an ASN corresponding to a subset of detected IP addresses 132. With poor reputations and/or low ratios for the ASN, on IP addresses and pools of IP addresses that have previously had success and are recognized may be allowed, however, with unknown IP addresses and/or those without prior successes, those IP addresses may be blocked. IP address rotation detection operations 136 may also include monitoring payload to detect password enumeration. This may be done by hashing portions of the password when entered and/or transmitted to determine if the same portion is being re-entered and another portion adjusted (e.g., by enumerating through a set of numbers or characters).

IP address rotation detection operations 136 may also use a network traffic or other computing log signature generated from a payload, endpoint, and/or machine fingerprint to determine similarities between logs. Similar logs from different IP addresses may indicate that those addresses are being shared and/or used by a machine during a computing attack or other action that rotates through IP addresses. IP address rotation detection operations 136 may also monitor and/or compare an originating point of access, such as whether the IP address is coming from a suspicious or malicious device, server, and/or location. When comparing the originating point of access, that device, server, and/or location for the IP address may be compared to a registered and/or detected device, server, and/or location used for account access that is being requested by the IP address to determine if there is a match and therefore is likely from a valid access source or is unfamiliar and therefore suspicious. This may also include comparing a time of access to a standard time of access to the account and/or a time zone registered for the account.

IP address rotation detection operations 136 may also check whether account names in a same or similar group is being enumerated through by determining if alphabetical or numerical enumeration is being performed. This may include enumerating through changes to a login, username, email address, or the like. Similarly, if the name is on a compromised or leaked group known from threat intelligence, other names in that group may be detected from other IP addresses, which may indicate those IP addresses are being shared and rotated during a computing attack. IP address rotation detection operations 136 may also compare a time-on-site by IP addresses to detect if they are performing automated operations including automated or scripted computing attacks. Where several IP addresses have the same or similar time-on-site (e.g., on a webpage or application interface), those IP addresses may be engaging in an automated computing attack together and/or executing the same script.

IP address rotation prevention operations 138 may include one or more operations to protect from computing attacks using IP address rotation. IP address rotation prevention operations 138 may include manual challenges, such as CAPTCHA and other requests that may require a user to identify as a human user and/or provide some information so that that user can be verified. This may also include multi-factor authentication challenges. In further embodiments, different status codes and other information may be returned to a device for one or more IP addresses if identified as possibly engaging in computing attacks through IP address rotation. For example, IP address rotation prevention operations 138 may return a 401 or 200 status code (e.g., failed or success, respectively) instead of a 429 status code indicating an IP address is blocked. In further embodiments, a failed or other response may be provided during carding attacks that are attempting to determine if cards are valid (e.g., by adding to an account and/or attempting a transaction of zero dollars or a low amount). Thus, if the card credentials and/or numbers are more than one, two, or another small number different, those attempts may be provided with a different status code that may hide whether the card is valid and therefore protect from the carding attacks.

Service applications 122 may correspond to one or more processes to execute modules and associated specialized hardware of service provider server 120 to provide a service to end users of service provider server 120, such as to process a transaction between users or entities or provide other computing services. In this regard, service applications 122 may correspond to specialized hardware and/or software used by a user associated with malicious device 110 to perform one or more services, which may be protected from computing attacks, fraudsters, and the like using rotating IP address protection framework 130 when computing attacks are executed using a rotation of IP addresses from IP address provider 140. In some embodiments, service applications 122 may be used to establish an account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. The payment account may be accessed and/or used through a browser application and/or dedicated payment application executed by malicious device 110 to engage in transaction processing through service applications 122. Service applications 122 may also correspond to messaging, social networking, media posting or sharing, microblogging, data browsing and searching, online shopping, and other services available through service provider server 120.

Additionally, service provider server 120 includes database 124 used to store information, which may be used with malicious device 110 and/or the operations of service applications 122 and rotating IP address protection framework 130. Database 124 may store various identifiers associated with malicious device 110. Database 124 may also store account data, including payment instruments and authentication credentials, as well as transaction processing histories and data for processed transactions. Database 124 may store account data, financial information, or other data generated and stored by service applications 122. Database 124 may also store IP address data 126 that may be used by rotating IP address protection framework 130 during identification of IP address rotations used during computing attacks.

In various embodiments, service provider server 120 includes at least one network interface component 128 adapted to communicate malicious device 110, IP address provider 140, and/or other devices, servers, or resources over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

IP address provider 140 may correspond to one or more providers of IP addresses for use over a network for network communications and identification of endpoints. In this regard, IP address provider 140 may provide a pool of IP addresses, where each IP address may be used by one or more devices for network communications and identification of endpoints in network traffic logs and the like. IP address provider 140 may therefore correspond to one or more botnets (e.g., pools or sets of computing devices that may be infected or controlled by bots), proxy servers and devices, VPNs, tunneling services, cloud APIs that provide IP addresses, and the like.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
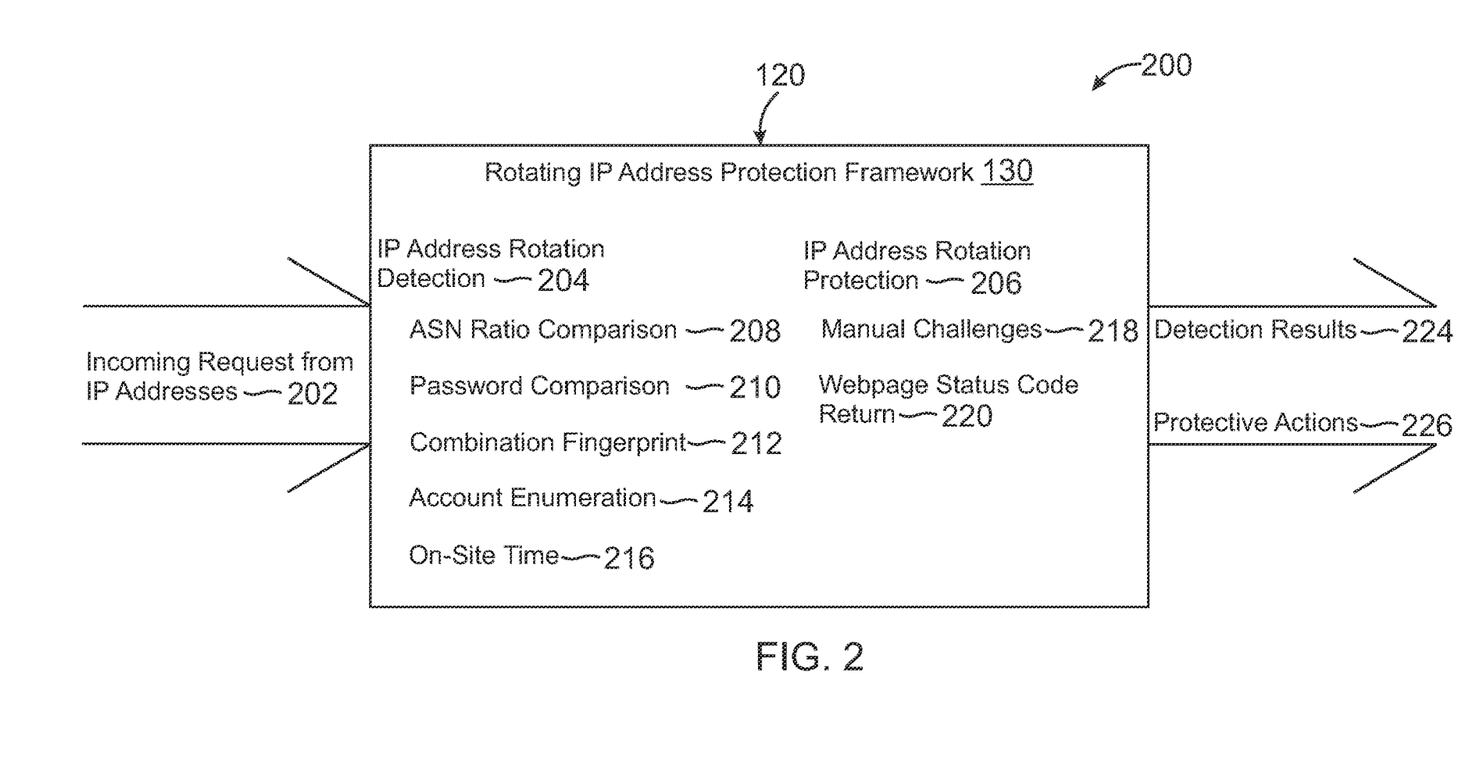
FIG. 2 is an exemplary system environment for detecting and protecting from IP address rotation during computing attacks, according to an embodiment.

FIG. 2 is an exemplary system environment 200 for detecting and protecting from IP address rotation during computing attacks, according to an embodiment. System environment 200 includes operations which may be executed using rotating IP address protection framework 130 of service provider server 120, discussed in reference to system 100 of FIG. 1. In this regard, system environment 200 includes incoming requests from IP addresses 202 that are processed by rotating IP address protection framework 130 to provide output decisions regarding detection results 224 and protective actions 226 to limit, mitigate, and/or prevent computing attacks conducted using IP address rotation.

In system environment 200, incoming requests from IP addresses 202 may correspond to API requests and/or other communications that may include requests for access to services, login and/or account access, payment card verification and/or use, and/or other operations. These requests may further include or be associated with network traffic and/or computing logs. In this regard, rotating IP address protection framework 130 may determine whether computing attacks are using IP address rotation, as well as which IP addresses are being rotated and potentially being used for malicious purposes (e.g., to block). This may include using IP address rotation detection 204 to determine whether IP addresses are being rotated and identify those addresses.

IP address rotation detection 204 of rotating IP address protection framework 130 may include an ASN ratio comparison 208, a password comparison 210, a combination fingerprint 212, an account enumeration 214, and an on-site time 216. ASN ratio comparison 208 may be used to determine a ratio of abuses or failures for IP addresses associated with an ASN to their unique successes and/or valid uses with a service provider. Thus, those ASNs with poor scores, ratios, and/or reputations may be identified, and their corresponding IP addresses may be blocked if unfamiliar and/or highly abusive, while only IP addresses having successes may be allowed for use with service provider server 120. Password comparison 210 may be used by rotating IP address protection framework 130 in order to determine if a same or similar payload for a password is being attempting during a credential stuffing and/or credential enumeration attack with multiple different IP addresses.

Combination fingerprint 212 may be used to determine if multiple IP addresses are providing the same or similar data, targeting the same endpoint, and/or have the same or similar machine fingerprint. Thus, combination fingerprint 212 may include a combination of data for the detected IP addresses to find matching or similar attacks by a group of IP addresses. Account enumeration 214 may also analyze a payload that includes a username, account name or identifier, login name, email address, or the like. When using account enumeration 214, rotating IP address protection framework 130 may determine whether an account name or identifier is being enumerated through and/or is found on a list of compromised accounts that indicate the IP addresses are engaged in a computing attack using enumerated credentials. Additionally, to detect automated attacks, rotating IP address protection framework 130 may use on-site time 216 to determine if IP addresses are having the same and/or very short time on a website or user interface that indicate an automated attack. Based on IP address rotation detection 204, detection results 224 may be output by rotating IP address protection framework 130, which may indicate if IP addresses are detected as being rotated during a computing attack and/or the type of computing attack being performed.

In order to mitigate or prevent abuse, rotating IP address protection framework 130 further executes IP address rotation protection 206 to limit, mitigate, or prevent abuses from IP address rotation. IP address rotation protection 206 may include manual challenges 218 and/or webpage status code return 220 in order to protect from IP address rotation. Further, IP address rotation protection 206 may also execute operations to block and/or unblock IP addresses. Manual challenges 218 may include CAPTCHA challenges, challenges to enter data specific to an account or other data that access to is requested, perform an activity or respond to a question requiring human knowledge and/or skills, and/or provide a response to a multifactor authentication. Webpage status code return 220 may include returning a specific webpage status code and/or other interface data that indicates a success, failure, and/or block of an IP address. By returning different and/or unexpected status codes to an IP address, the IP address may be unaware that it is blocked and may continue to submit requests that are not processed. Further, this process may indicate that an operation has failed even if successful to hide or mitigate damage from identifying stolen credentials and/or financial information. Based on IP address rotation protection 206, protective actions 226 may be output, including the aforementioned processes and/or blocking of IP addresses. Protective actions 226 may also include replacing or sending varied status codes in order to mask blocked IP addresses and/or successful but fraudulent financial data verifications.

FIGS. 3A-3G are exemplary diagrams 300a, 300b, 300c, 300d, 300e, 300f, and 300g of measures to detect when IP addresses are rotated and protections against attacks from rotating IP addresses by malicious entities, according to an embodiment. Diagrams 300a-300g of FIGS. 3A-3G include operations for detection and protection from IP address rotation during computing attacks, which may be executed using rotating IP address protection framework 130 of service provider server 120, discussed in reference to system 100 of FIG. 1.

Figure 3A:
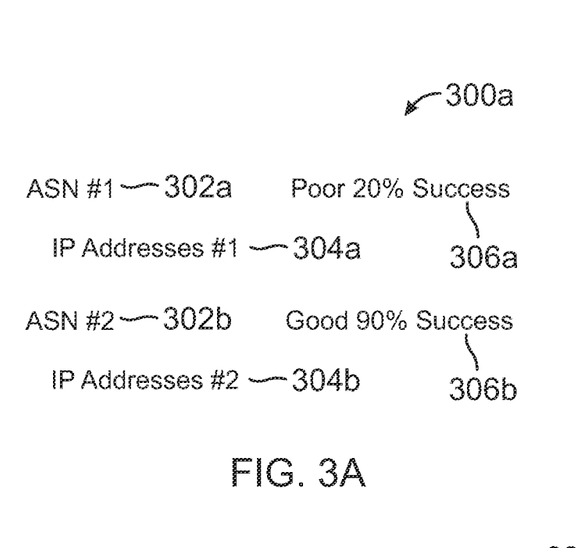
FIGS. 3A-3G are exemplary diagrams of measures to detect when IP addresses are rotated and protections against attacks from rotating IP addresses by malicious entities, according to an embodiment.

In diagram 300a of FIG. 3A, an ASN ratio analysis is performed for two ASNs having a pool or set of IP addresses that may be obtained and/or used by entities including malicious entities. For example, an ASN #1 302a may have a pool of IP addresses #1 304a. IP addresses #1 304a may be provided by a botnet, proxy, VPN, tunneling service, and/or cloud API that may allow use of IP addresses #1 304a to one or more machines for use with network communications and interactions. In this regard, a first ASN ratio 306a for ASN #1 302a may show a poor success to failure or abuse, which shows success is only 20% for valid operations and/or requests when compared to failures and/or abusive requests detected for IP addresses #1 304a. Thus, ASN #1 302a and IP addresses #1 304a may be treated more suspiciously and/or blocked, especially where a new or unknown IP address from IP addresses #1 304a is detected during use with a service provider. In contrast, an ASN #2 302b for IP addresses #2 304b may have a second ASN ratio 306b that shows a good success rate and low rate of abuse and/or failures during requests from IP addresses #2 304b. Thus, ASN #2 302b and/or IP addresses #2 304b may be treated with less suspicion during use of those IP addresses.

Figure 3B:
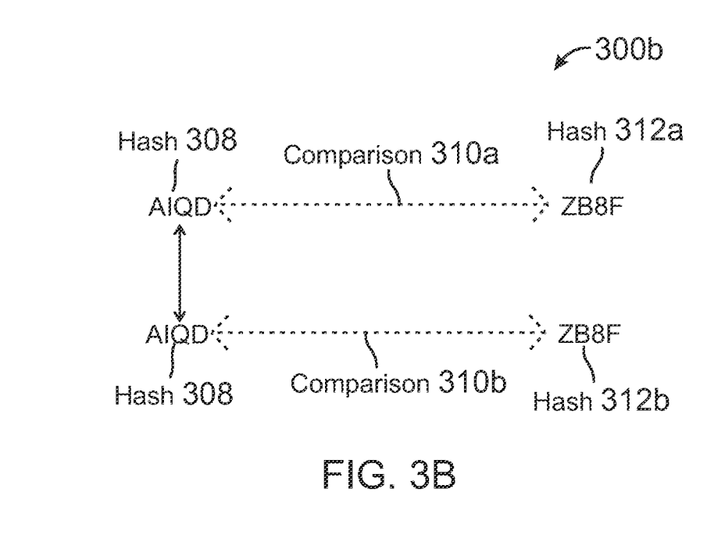

In diagram 300b of FIG. 3B, a partial password hashing comparison is done to determine if similar passwords or other hashed data in a payload is being received. When entering a password, an in-browser or in-application process may hash the password and/or an operation may hash the password when transmitted to or received by the corresponding service provider for the account being accessed. However, when hashing the password, two or more partial hashes or portions of the password may be formed. For example, a first portion hash 308 is shown having a hash (e.g., generated using a portion of the password as a seed for a hashing algorithm that outputs a randomization that hides the password). In diagram 300b, two second portion hashes are shown from second portions of the entered password. The password may be received in different login events by different IP addresses. Thus, when the second portion is hashed, different hashes may result as a second portion hash A 312a and a second portion hash B 312b. When performing a comparison 310a and a comparison 310b, second portion hash A 312a and second portion hash B 312b from the hashed password from different IP addresses and during different login events may not match. However, first portion hash 308 is the same in comparison 310a and comparison 310b, indicating that the same characters were entered in each login event. Thus, it may be determined that these different IP addresses were used when performing a credential stuffing attack or the like by enumerating or going through similar, but slightly changed, passwords that may be compromised.

Figure 3C:
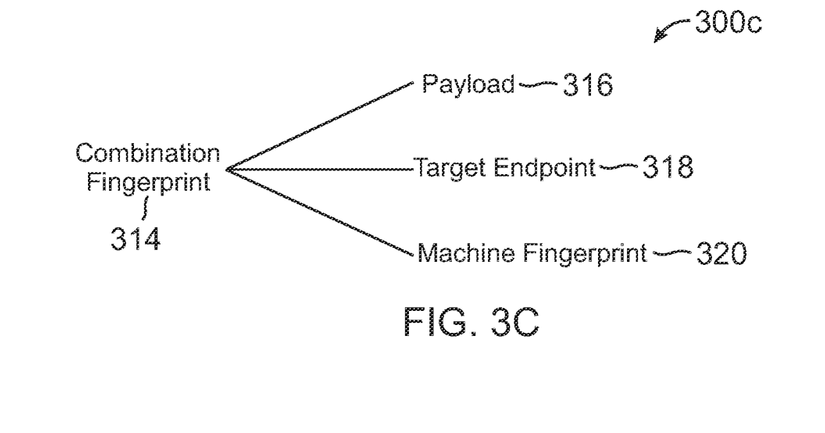

In diagram 300c of FIG. 3C, a combination fingerprint 314 may be analyzed to determine if multiple IP addresses are involved in the same or similar requests that may indicate a malicious computing attack or fraud. For example, combination fingerprint 314 may use a combination of a payload 316 (e.g., data for a request, such as a username, password, financial data, etc.), a target endpoint 318, and a machine fingerprint 320 to determine if combination fingerprint 314 from a computing log indicates similar requests by multiple IP addresses. This may be used to determine IP address rotation to perform the same or similar request. Thus, IP address rotation may be detected through combination fingerprint 314.

Figure 3D:
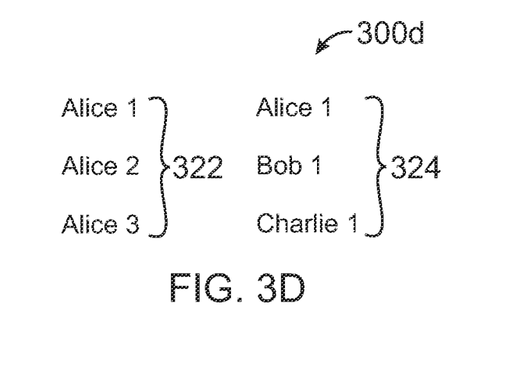

In diagram 300d of FIG. 3D, account enumeration using IP address rotation may be detected when multiple IP addresses are used to enumerate through a list of usernames and/or compromised login names and/or credentials in a leaked or compromised list or group identified from threat intel. For example, username enumeration 322 shows the username "Alice1", "Alice2", and "Alice3" being used for separate login attempts from multiple IP addresses, which may indicate the enumeration attack using rotating IP addresses. A threat intel list 324 may also include a list of compromised usernames, which may be used to detect IP address rotation during a computing attack and/or block IP addresses. In this regard, if IP addresses are detected as enumerating through threat intel list 324, those addresses may be blocked as additional IP addresses using other usernames in threat intel list 324 may be grouped as belonging to the same or similar computing attack that may use IP address rotation.

Figure 3E:
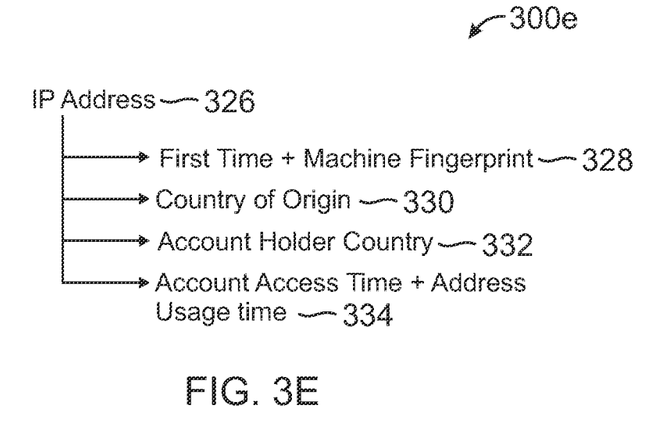

In diagram 300e of FIG. 3E, an originating point of access for an IP address 326 is analyzed to determine if the IP address and/or corresponding request is suspicious. For example, a first parameter 328 may analyze whether IP address 326 has not been seen before or in some time (e.g., last X days or months), is a first time use with a service provider, and/or has a machine fingerprint from a suspicious or malicious machine. Where first parameter 328 indicates that IP address 326 is new and the machine fingerprint is suspicious, IP address 326 may be treated suspiciously or blocked. Similarly, a second parameter 330 for IP address 326 may indicate that the IP address is from a suspicious country and/or does not match the country for the corresponding account or financial instrument being used in the request. Thus, second parameter 328 may be compared to account holder country 332 to identify whether IP address 326 is suspicious and may be used during IP address rotations for computing attacks. A fourth parameter for IP address 326 may also compare an access time and/or request time for the request by IP address 326 to identify whether the time matches a time zone for the account and/or common access time of the account.

Figure 3F:
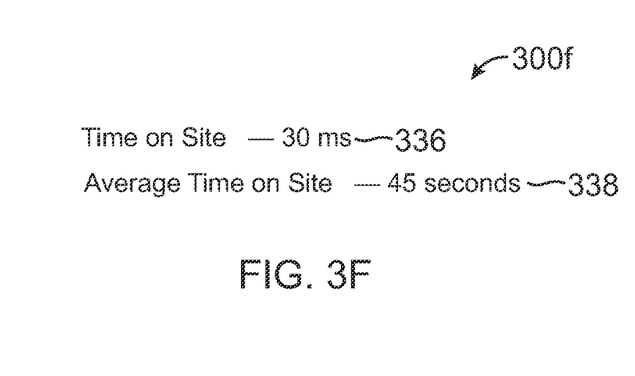

In diagram 300f of FIG. 3F, an average time on a website or an interface is analyzed to determine if an IP address is engaging in an automated computing attack and to group IP addresses that may be involved in the same or similar computing attack during an IP address rotation through a pool of IP addresses. In this regard, an IP address time on site 336 indicates that an IP address spends 30 ms on a website or interacting with an interface. This is compared to an average time on site 338 of 45 seconds (s). Thus, the IP address time on site 336 is much faster and indicates possible automated or scripted actions. Further, other IP addresses sharing this 30 ms time on site may be identified and grouped as executing the same automation or script.

Figure 3G:
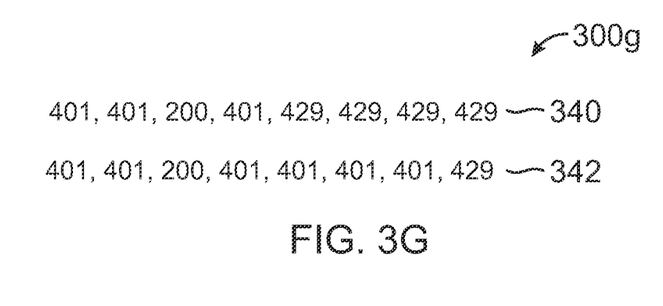

In diagram 300g of FIG. 3G, status codes are changed and returned to a machine for a particular IP address that may be engaged in IP address rotation during a computing attack. For example, for first status codes 340, an IP address may receive a 200 success status code, a 401 failure status code, or a 429 blocked status code for requests from a service provider. When 429 blocked is returned, the IP address may be rotated to a new IP address to get around blocking of the corresponding machine and continued execution of a computing attack. Thus, when first status codes 340 reach the fifth listed status code of 429 blocked, the IP address may be indicated as blocked and rotated. However, in second status codes 342, instead of the fifth through seventh listed status codes returning 429 blocked, a 401 failure status code may be returned. In this regard, the machine may therefore continue using the IP address without rotating and being aware the IP address has been blocked, which may mitigate damage, fraud, and/or loss caused by the computing attack.

Figure 4:
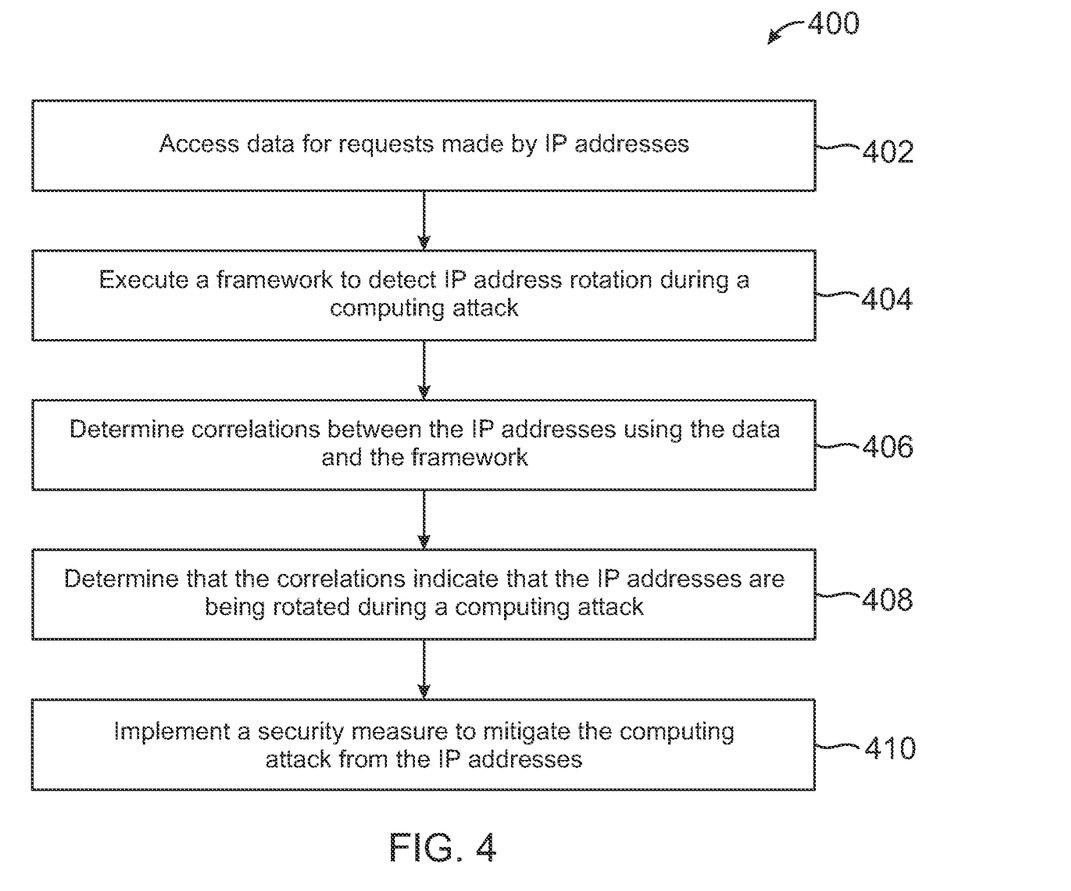
FIG. 4 is a flowchart for computing system defenses to rotating IP addresses by malicious entities during computing attacks, according to an embodiment.

FIG. 4 is a flowchart 400 for computing system defenses to rotating IP addresses by malicious entities during computing attacks, according to an embodiment. Note that one or more steps, processes, and methods described herein of flowchart 400 may be omitted, performed in a different sequence, or combined as desired or appropriate.

At step 402 of flowchart 400, data for requests made by IP addresses is accessed. The data for the requests may correspond to network traffic or other computing logs that may be associated with an API request by a set of IP addresses. The IP addresses may correspond to IP addresses for one or more ASNs and/or IP address providers, which may be analyzed to determine if the IP addresses are in a pool being used by one or a set of machines for a malicious entity or bad actor that is engaged in a computing attack. In this regard, the data may include information associated with a machine fingerprint for the machine associated with each IP address, a payload provided by each of the IP addresses for processing, a target endpoint for each request, and information about the IP addresses. The IP addresses and the corresponding data may be identified, selected, and/or determined based on a specific time period, during monitoring of web traffic, and/or in response to detecting other computing attacks from similar ASNs, IP addresses, locations, or the like. The IP addresses and corresponding data may also be selected and/or determined based on a target endpoint, such as if fraud or attacks are targeting a specific endpoint, computing service, machine or set of machines, and the like.

At step 404, a framework to detect IP address rotation during a computing attack is executed. The framework may include multiple processing operations that may be used to detect IP address rotations during computing attacks, as well as protect against those computing attacks, IP addresses, and/or rotation through the IP addresses. For example, the framework may include computing operations to perform ASN success to failure/abuse ratio comparisons, partial password hashing comparisons, computing log fingerprint analysis from a combination of IP address data, account enumeration for misappropriated and/or leaked account data, and/or on-site time analysis. These techniques may be used to identify IP address rotations. Further, the operations may be used to protect from computing attacks and IP address rotations including manual challenges, varying status code returns, and/or IP address blocking.

At step 406, correlations between the IP addresses using the data and the framework are determined. The correlations may be used to determine if IP addresses are being rotated and involved in the same or similar computing attack from a malicious entity and identify those IP addresses. For example, the correlations may be used to identify IP addresses in a pool being used by a machine. The correlations may therefore link the IP addresses but may not necessarily indicate that the IP addresses are being used maliciously and/or in a computing attack. Thus, at step 408, it is determined that the correlations indicate that the IP addresses are being rotated during a computing attack. For example, once identifying that the IP addresses are correlated and being used by the same or similar machine for a malicious entity or bad actor, the service provider's framework and operations may determine that the IP addresses are also involved in a computing attack.

For example, payloads, computing logs, API requests, and the like may be analyzed to determine if the IP addresses are performing credential stuffing, signup and/or account validation, a carding attack, a fraudulent transaction processing request, a password attack or enumeration, account enumeration, brute-force attacks and logins, and the like. This may be determined based on the data used to identify the correlations between the IP addresses. Once identified, at step 410, a security measure to mitigate the computing attack from the IP addresses is implemented. The security measure may seek to reduce and/or prevent a potential computer security breach caused by the computing attack using the IP address rotation. In some embodiments, a manual challenge for a human user and/or verified user for an account may be issued and/or the corresponding IP address may be blocked (or the request refused). Further, the security measure may instead return other data that may hide or obfuscate the actual results of a request. For example, the returned data may hide that the IP address is blocked and/or a card verification was successful.

Figure 5:
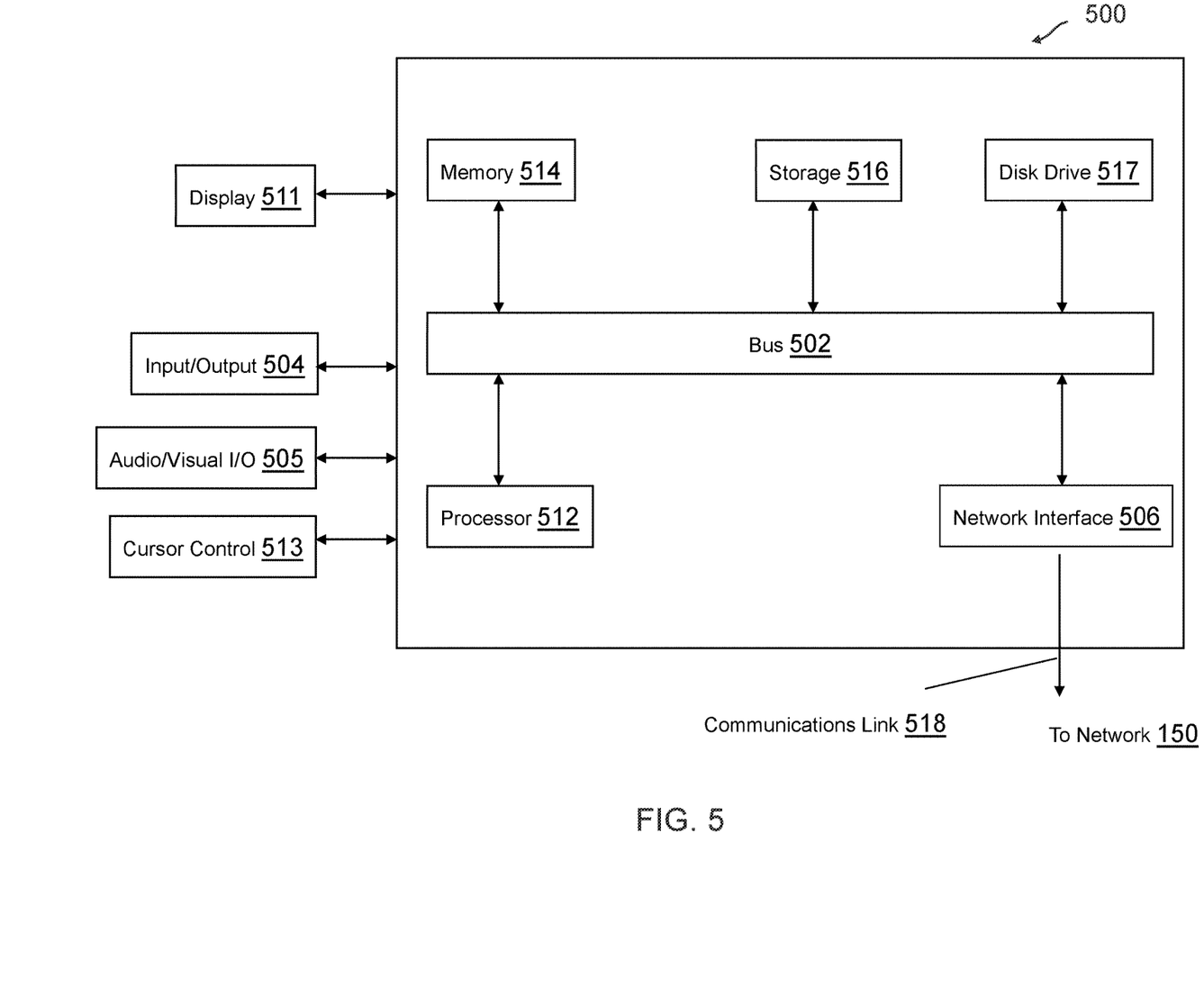
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system comprising: a non-transitory memory; and one or more hardware processors coupled to the non-transitory memory and configured to read instructions from the non-transitory memory to cause the computer system to perform operations comprising:
   accessing a plurality of network traffic logs received by the computer system for a plurality of application programming interface (API) requests, wherein the plurality of network traffic logs are associated with a plurality of Internet protocol (IP) addresses;
   executing a rotating IP address protection framework that comprises a plurality of computing operations executable by the computer system with the plurality of network traffic logs, wherein the plurality of computing operations are configured to protect computing services provided by the computer system from IP address rotations by malicious entities during computing attacks on the computer system;
   determining 1) one or more numbers in the plurality of IP addresses used to group the plurality of IP addresses by an autonomous system and 2) a ratio of prior processing successes associated with at least a portion of the plurality of IP addresses to prior processing failures associated with at least the portion of the plurality of IP addresses, where in the plurality of IP addresses are provided by the autonomous system and usable by different computer systems;
   calculating, using the executed rotating IP address protection framework, a reputation score for at least the portion of the plurality of IP addresses based on the one or more numbers in the plurality of IP addresses and the ratio;
   determining one or more correlations between the plurality of IP addresses for the plurality of API requests based on the plurality of network traffic logs, the calculated reputation score, and the executing the rotating IP address protection framework;
   determining, based on the executing the rotating IP address protection framework, that the one or more correlations indicate an IP address rotation through the plurality of IP addresses during a computing attack; and
   executing a protective computing action with the plurality of API requests based on the determining the one or more correlations indicate the IP address rotation through the plurality of IP addresses during the computing attack.

2. The computer system of claim 1, wherein the determining the one or more correlations is further based on at least one of:
  determining whether two or more of the plurality of API requests share a target endpoint;
  determining whether two or more of the plurality of API requests include at least one of a shared payload or a shared payload pattern; or
  determining whether two or more of the plurality of network traffic logs have a timestamp within a same time period.

3. The computer system of claim 2, wherein the determining whether the two or more of the plurality of API requests include at least one of the shared payload or the shared payload pattern comprises determining whether the two or more of the plurality of API requests include one or more passwords that share at least a portion of alphanumeric characters in the one or more passwords.

4. The computer system of claim 3, wherein the determining whether the two or more of the plurality of API requests include the one or more passwords that share the at least the portion of the alphanumeric characters comprises matching hashes computed from the at least the portion of the alphanumeric characters in the one or more passwords.

5. The computer system of claim 2, wherein the determining the one or more correlations is further based on a plurality of network traffic log fingerprints for the plurality of network traffic logs, and wherein each of the plurality of network traffic log fingerprints is generated based on a combination of a device fingerprint for a device associated with the plurality of network traffic logs, the target endpoint, the at least one of the shared payload or the shared payload pattern, or a combination thereof.

6. The computer system of claim 1, wherein the operations further comprise:
  determining an autonomous system number (ASN) corresponding to the one or more numbers that groups the plurality of IP addresses,
  wherein the calculating the reputation score is further based on ASN.

7. The computer system of claim 1, wherein the determining the one or more correlations is further based on at least one of:
  determining whether each of the plurality of IP addresses have been utilized with the computer system over a previous time period;
  determining whether a country of origin associated with the each of the plurality of IP addresses matches a country associated with an account requested to be accessed by each of the plurality of API requests; or
  determining whether an access time for the account requested to be accessed by the each of the plurality of API requests matches a standard time of access by the account.

8. The computer system of claim 1, wherein the determining the one or more correlations is further based on one or more alphanumeric character similarities between a plurality of account usernames enumerated in the plurality of API requests.

9. The computer system of claim 1, wherein the determining the one or more correlations is further based on a time spent on a website or an application interface during each of the plurality of API requests.

10. The computer system of claim 1, wherein the executing the protective computing action comprises inserting a manual challenge to a webpage or an application interface associated with a response to each of the plurality of API requests.

11. A method comprising:
  detecting usages of a set of IP addresses during a time period for a set of API requests targeting one or more computing endpoints of an online platform of a service provider;
  determining one or more attributes for at least one of the set of IP addresses or the set of API requests, wherein the one or more attributes correspond to one or more of a structure of the set of IP addresses, the one or more computing endpoints, one or more payloads of the set of API request, or a temporal proximity of the usages of the set of IP addresses during the time period;
  determining 1) one or more numbers in the set of IP addresses used to group the set of IP addresses by an autonomous system and 2) a ratio of prior processing successes associated with each of the set of IP addresses to prior processing failures associated with each of the set of IP addresses, wherein the set of IP addresses are provided by the autonomous system and usable by different computer systems;
  calculating a reputation score for at least a portion of the set of IP addresses based on the one or more numbers and the ratio;
  determining whether at least a subset of the set of IP addresses are being rotated through during a computing attack based on the one or more attributes and the calculated reputation score; and
  performing a mitigation operation with the at least the subset of the set of IP addresses, wherein the mitigation operation is configured to limit a potential computer security breach caused by the computing attack.

12. The method of claim 11, wherein the mitigation operation comprises providing a manual challenge for a user to complete a test, performing a multifactor authentication, or entering user data for the user.

13. The method of claim 11, wherein the mitigation operation comprises blocking the at least the subset of the set of IP addresses and returning a blocked status code to the at least the subset of the set of IP addresses.

14. The method of claim 11, wherein the mitigation operation comprises returning at least one different status code in place of a blocked status code to the at least the subset of the set of IP addresses.

15. The method of claim 11, wherein the potential computer security breach comprises at least one of a data exposure, an account takeover, or a fraudulent processing request.

16. A non-transitory machine-readable medium having stored thereon machine-readable instructions executable to cause a machine to perform operations comprising:
  accessing data associated with computing requests from a plurality of Internet protocol (IP) addresses;
  determining one or more of a plurality of computing operations configured to protect one or more of applications or resources of an online service provider platform from a computing attack executed with two or more of the plurality of IP addresses during an IP address rotation;
  determining 1) one or more numbers in the two or more of the plurality of IP addresses used to group at least a portion of the plurality of IP addresses by an autonomous system and 2) a ratio of prior processing successes associated with the two or more of the plurality of IP addresses to prior processing failures associated with the two or more of the plurality of IP addresses, wherein at least a portion of the plurality of IP addresses are provided by the autonomous system for usage by different computer systems;

calculating, using the one or more of the plurality of computing operations, a reputation score for at least the portion of the plurality of IP addresses based on one or more numbers and the ratio;

determining a correlation between the two or more of the plurality of IP addresses based on the data, the calculated reputation score, and the one or more of the plurality of computing operations;

determining, based on the one or more of the plurality of computing operations, that the correlation indicates the IP address rotation of the two or more of the plurality of IP addresses during the computing attack; and executing an additional one or more of the plurality of computing operations with the two or more of the plurality of IP addresses based on a protective operation to mitigate the computing attack during the IP address rotation.

17. The non-transitory machine-readable medium of claim 16, wherein the executing the additional one or more of the plurality of computing operations comprises returning a number of failed webpage status codes in place of one or more blocked webpage status codes responsive to each of the computing requests.

18. The non-transitory machine-readable medium of claim 16, wherein the computing attack comprises one of a fraudulent electronic transaction processing request, an account enumeration attack, a carding attack for a number of credit card number validation, or an account password validation attack.

19. The non-transitory machine-readable medium of claim 16, wherein the data for the computing requests comprise a plurality of attributes that are associated with at least one of a device parameter, a network communications parameter, an account identifier, an account credential, or a device identifier.

20. The non-transitory machine-readable medium of claim 16, wherein the correlation comprises an identification that the two or more of the plurality of IP addresses are being used by a same machine during the computing attack.

* * * * *

UNITED STATES PATENT AND TRADEMARK OFFICE
CERTIFICATE OF CORRECTION

PATENT NO. : 12,316,650 B2
APPLICATION NO. : 17/481189
DATED : May 27, 2025
INVENTOR(S) : George Chen Kaidi Page 1 of 1

It is certified that error appears in the above-identified patent and that said Letters Patent is hereby corrected as shown below:

In the Claims

Claim 6, Column 19, Line 40, change "based on ASN." to --based on the ASN.--

Signed and Sealed this
Fifth Day of August, 2025

Coke Morgan Stewart
*Acting Director of the United States Patent and Trademark Office*